US010416293B2

(12) United States Patent
Buckley et al.

(10) Patent No.: US 10,416,293 B2
(45) Date of Patent: Sep. 17, 2019

(54) HISTOGRAM READOUT METHOD AND CIRCUIT FOR DETERMINING THE TIME OF FLIGHT OF A PHOTON

(71) Applicant: SensL Technologies Ltd, County Cork (IE)

(72) Inventors: Steven John Buckley, Henlow (GB); John Carlton Jackson, Cobb (IE)

(73) Assignee: SENSL TECHNOLOGIES LTD., County Cork (IE)

( * ) Notice: Subject to any disclaimer, the term of this patent is extended or adjusted under 35 U.S.C. 154(b) by 374 days.

(21) Appl. No.: 15/376,464

(22) Filed: Dec. 12, 2016

(65) Prior Publication Data
US 2018/0164415 A1   Jun. 14, 2018

(51) Int. Cl.
*G01C 3/08* (2006.01)
*G01S 7/486* (2006.01)
*G01S 17/10* (2006.01)
*G04F 10/00* (2006.01)

(52) U.S. Cl.
CPC .......... *G01S 7/4861* (2013.01); *G01S 7/4863* (2013.01); *G01S 7/4865* (2013.01); *G01S 17/10* (2013.01); *G01S 17/107* (2013.01); *G04F 10/005* (2013.01)

(58) Field of Classification Search
CPC ................................ G01S 7/486; G01S 17/10
USPC ....................................................... 356/5.01
See application file for complete search history.

(56) References Cited

U.S. PATENT DOCUMENTS

| 5,760,887 A  *  | 6/1998 | Fink   | G01S 17/10  |
|---|---|---|---|
|   |   |   | 356/5.03 |
| 8,237,934 B1 *  | 8/2012 | Cooke  | G01S 17/66  |
|   |   |   | 356/614 |
| 2012/0162632 A1* | 6/2012 | Dutton | G01S 7/486  |
|   |   |   | 356/5.01 |

(Continued)

FOREIGN PATENT DOCUMENTS

GB           2486668 A     6/2012

OTHER PUBLICATIONS

International Search Report and Written Opinion for International Application No. PCT/EP2017/082463, dated May 2, 2018, 14 pages.

(Continued)

*Primary Examiner* — Mark Hellner
(74) *Attorney, Agent, or Firm* — Polansky & Associates, P.L.L.C.

(57) ABSTRACT

A histogramming readout circuit is described. The readout circuit comprises a time to digital converter (TDC) configured to continually report time-stamps defining an arrival time of a laser clock and a signal output from a photosensor. Memory is provided for 10 storing TDC events. A programmable processor is configured to implement a state machine. The state machine being operable to save a time-stamp when a TDC event is detected; determine the time of flight of each of the photons detected by the photosensor; use each calculated time of flight to address a memory location; build up a histogram of the TDC data values using the memory locations as time-bins; and maintain a pointer to a maximum memory location where the highest number of TDC event resides. A calculator is operable to read the value of the maximum memory location and one or more adjacent time-bins either side for processing.

29 Claims, 11 Drawing Sheets

(56) References Cited

U.S. PATENT DOCUMENTS

2016/0209498 A1 7/2016 Kanter

OTHER PUBLICATIONS

Salvatore Gnecchi, Neale A. W. Dutton, Luca Parmesan, Bruce R. Rae, Sara Pelligrini, Stuart J. McLeod, Lindsay A. Grant and Robert K. Henderson; "Digital Silicon Photomultipliers With OR/XOR Pulse Combining Techniques"; IEEE Transactions on Electron Devices; vol. 63; No. 3; Mar. 2016; 6 pages.
Christiano Niclass, Mineki Soga, Hiroyuki Matsubara, Masam Ogawa and Manubu Kagami; "A 0.18-µm CMOS SoC for a 100-m-Range 10-Frame/s 200 x 96-Pixel Time-of-Flight Depth Sensor"; IEEE Journal of Solid-State Circuits; vol. 49; No. 1; Jan. 2014; 16 pages.

\* cited by examiner

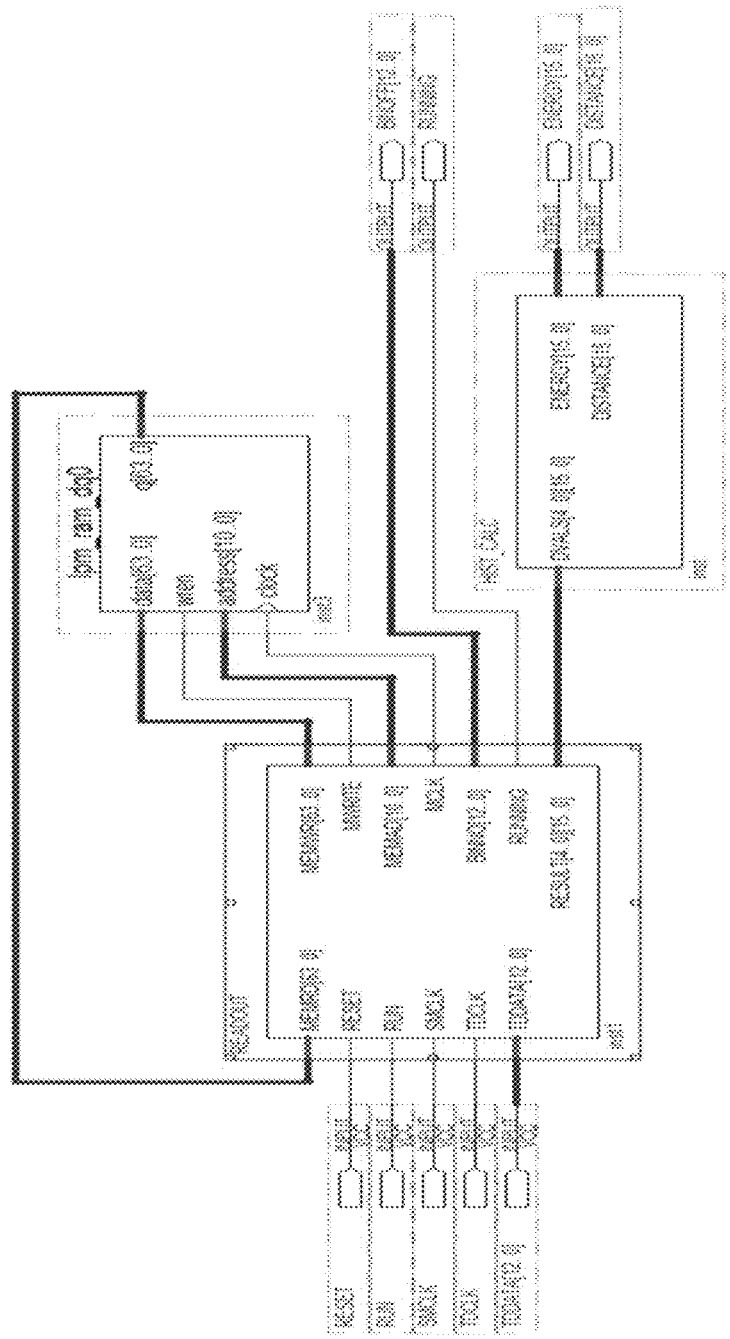

HISTOGRAM READOUT METHOD AND CIRCUIT FOR DETERMINING THE TIME OF FLIGHT OF A PHOTON

FIELD OF THE INVENTION

The invention relates to a histogram readout method and circuit for determining the time of flight of a photon. The present disclosure also relates to photon detectors. In particular, the present disclosure relates to high sensitivity photon detectors such as semiconductor photomultipliers. In particular, but not exclusively, the present disclosure relates to semiconductor photomultipliers (SiPMs or SPMs) used in Laser Ranging [LIDAR] applications.

BACKGROUND

A Time to Digital Converter (TDC) may be considered as a very high precision counter/timer that can record the time of an event to sub 1 ns resolution. The TDC may be used to measure the time of flight of a photon from a laser pulse to a target and back to a photo sensor. The digital time, provided by the TDC, is used as an address to access a corresponding memory location. Each memory location corresponds to a time period equal to the least significant bit of the TDC. This memory location is then incremented. Multiple measurements will result in the building up a histogram in memory. Histogramming readout technique traditionally involves periodically streaming all the readout contents from memory to a computer. The computer would then analyse the data to determine the position of a peak. To determine the range, the computer selected the region of interest (peak region) and carried out a Gaussian fit to determine the true peak. This technique is extremely time consuming requiring the streaming of large amounts of data and then implementing a complex calculation. In a fast application the time taken using this technique is not acceptable.

There is therefore a need to provide for a histogram readout method and circuit for determining the time of flight of a photon which addresses at least some of the drawbacks of the prior art.

SUMMARY

The present disclosure relates to a histogramming readout circuit comprising:
  a time to digital converter (TDC) being configured to report time-stamps when a TDC event is detected;
  memory for storing TDC events;
  a programmable processor configured to implement a state machine; the state machine being operable to
    saves a time-stamp when a TDC event is detected;
    determine the time of flight of a photon;
      using each calculated time of flight to address a memory location;
      building up a histogram of TDC events using the memory locations as time-bins;
      maintaining a pointer to a maximum memory location where the highest number of TDC event resides; and
  a calculator being operable to read the value of the maximum memory location and one or more adjacent time-bins for processing.

In one aspect, the memory comprises a first memory module and a second memory module.

In another aspect, one of the first memory module and second memory module is used for histogramming while the contents of the other one of the first and second memory modules is being cleared.

In an exemplary aspect, the state machine maintains at least one flag indicating which one of the first memory module and second memory module is active during histogramming while the other one of first memory module and the second memory module is inactive.

In a further aspect, the state machines tracks at least two variables.

In one aspect, the at least two variable includes a peak pointer and a peak value.

In another aspect, the state machine reads the contents of the time-bin and increments the address to generate a new time-bin address.

In a further aspect, the the new time-bin value is compared with the current time-bin value of the peak value pointer.

In another aspect, if the comparison is greater, the value of the new time-bin is copied into the peak value and the new time-bin address is copied into the peak pointer.

In one aspect, the state machine waits for another TDC event. Advantageously, the state machine checks if a pre-defined number of laser cycles required to acquire a measurement has been reached.

In a further aspect, when the pre-defined number of laser cycles has been reached; the state machine reads the memory locations, one or more before the peak point address, the location at the peak point address and one or more after the peak pointer address.

In one aspect, the state machine reads five memory locations, two before the peak pointer address, the location at the peak pointer address and two after the peak pointer address.

In another aspect, these read values are acquired by the calculator for determining the power and peak position data.

In one aspect, the state machine reverses the pointers to the other memory module that was previously being cleared so that it is active for storing TDC events for the next pre-defined number of laser cycles.

The present disclosure also relates to a histogram readout method for determining the time of flight of a photon using the circuit of claim 1; the method comprising:
  (i) measuring the time of flight of a photon from a laser pulse to a target and back to a photosensor using a Time to Digital Converter (TDC);
  (ii) using the digital time as an address to access a corresponding memory location; each memory location corresponds to a time period equal to the least significant bit of the TDC;
  (iii) incrementing the memory location;
  generating a histogram by repeating steps (i) to (iii) a plurality times; wherein each memory location reports the number of times the TDC recorded that specific time;
  after a predetermined number of samples the memory locations will contain a peak region where the majority of TDC times were recorded; and
  analysising the peak region to determine the time of flight of the photon.

In one aspect, after a set cycle time a state machine stops recording the histogram and reads the value of the maximum location and one or more adjacent time-bins either side thereof.

In another aspect, these read values are then passed to a calculation module for calculating the ToF value.

In a further aspect, the calculation module uses weighted averaging to calculate the ToF.

In one aspect, the numerator is scaled up by 16.

In a further aspect, the calculation module outputs the ToF value in realtime.

In an exemplary aspect, the calculation module is programmed to sum the read values as an indication of the level of activity.

In another aspect, the calculation module is operable to calculate the the ToF value to an accuracy of less than the LSB of the TDC.

The present disclosure also relates to a LiDAR ranging system comprising
- a histogramming readout circuit including:
  - a time to digital converter (TDC) being configured to report time-stamps when a TDC event is detected;
  - memory for storing TDC events;
  - a programmable processor configured to implement a state machine; the state machine being operable to
    - saves a time-stamp when a TDC event is detected;
    - determine the time of flight of a photon;
    - using each calculated time of flight to address a memory location;
    - building up a histogram of TDC events using the memory locations as time-bins;
    - maintaining a pointer to a maximum memory location where the highest number of TDC event resides; and
  - a calculator being operable to read the value of the maximum memory location and one or more adjacent time-bins for processing; and
- a light detector operably coupled to the histogramming readout circuit.

In one aspect the light detector comprises a single photon avalanche diode (SPAD).

In another aspect, the light detector comprises a silicon photomultiplier.

The present disclosure also relates to a 2D imaging system comprising
- a histogramming readout circuit including:
  - a time to digital converter (TDC) being configured to report time-stamps when a TDC event is detected;
  - memory for storing TDC events;
  - a programmable processor configured to implement a state machine; the state machine being operable to
    - save a time-stamp when a TDC event is detected;
    - determine the time of flight of a photon;
    - using each calculated time of flight to address a memory location;
    - building up a histogram of TDC events using the memory locations as time-bins;
    - maintaining a pointer to a maximum memory location where the highest number of TDC event resides; and
  - a calculator being operable to read the value of the maximum memory location and one or more adjacent time-bins for processing;
- a scanner for diverting laser light pulses over a 2D region; and
- a light detector operably coupled to the histogramming readout circuit In one aspect, the light detector comprises an array of single photon avalanche diodes (SPAD).

In a further aspect, the light detector comprises an array of silicon photomultipliers.

The present teaching also relates to a readout circuit for determining the time of flight of a photon; the readout circuit comprising:
- a Time to Digital Converter (TDC) for measuring the time of flight of a photon from a laser pulse to a target and back to a photosensor;
- a memory module;
- a readout module being operable to
  - (i) read the measured ToF of a photon from a laser pulse to a target and back to a photosensor using the TDC;
  - (ii) use the digital time as an address to access a corresponding memory location; each memory location corresponds to a time period equal to the least significant bit of the TDC;
  - (iii) incrementing the memory location; and
  - repeating steps (i) to (iii) a plurality times; wherein each memory location reports the number of times the TDC recorded that specific time;
  - after a predetermined number of samples the memory locations will contain a peak region where the majority of TDC times were recorded; and
- a histogram calculation module being operable to analyse the peak region to determine the time of flight of the photon.

These and other features will be better understood with reference to the followings Figures which are provided to assist in an understanding of the present teaching.

BRIEF DESCRIPTION OF THE DRAWINGS

The present teaching will now be described with reference to the accompanying drawings in which:

FIG. 9 illustrates a top level design of a readout circuit for determining ToF in accordance with the present teaching.

DETAILED DESCRIPTION OF THE DRAWINGS

Figure 1:
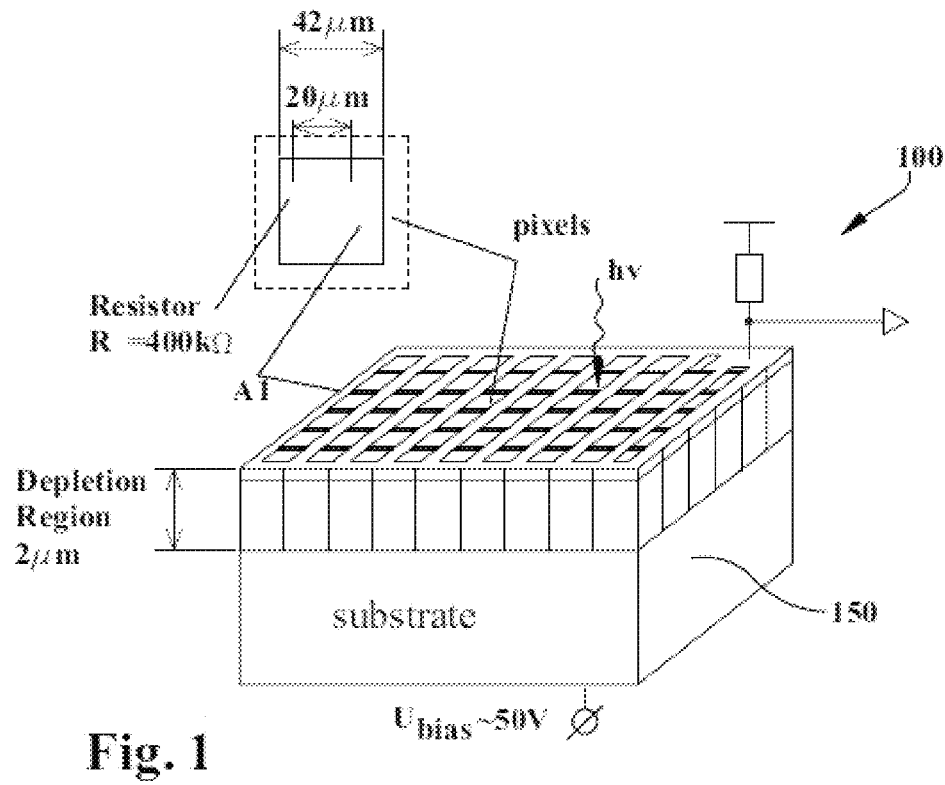
FIG. 1 illustrates an exemplary structure of a silicon photomultiplier.

The present disclosure will now be described with reference to an exemplary histogram readout method and circuit for determining the time of flight of a photon. It will be understood that the exemplary method is provided to assist in an understanding of the teaching and is not to be construed as limiting in any fashion. Furthermore, circuit elements or components that are described with reference to any one Figure may be interchanged with those of other Figures or other equivalent circuit elements without departing from the spirit of the present teaching. It will be appreciated that for simplicity and clarity of illustration, where considered appropriate, reference numerals may be repeated among the figures to indicate corresponding or analogous elements.

Figure 2:
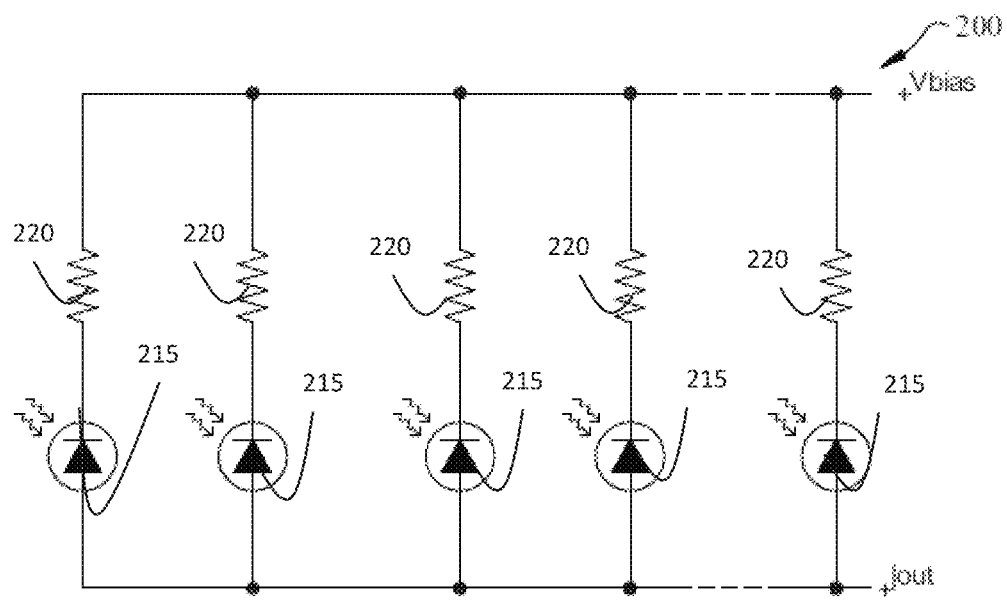
FIG. 2 is a schematic circuit diagram of an exemplary silicon photomultiplier.

Referring initially to FIG. 1, a silicon photomultiplier 100 comprising an array of Geiger mode photodiodes is shown. As illustrated, a quench resistor is provided adjacent to each photodiode which may be used to limit the avalanche current. The photodiodes are electrically connected to common biasing and ground electrodes by aluminium or similar conductive tracking. A circuit schematic 200 is shown in FIG. 2 for a conventional silicon photomultiplier 100 in which the anodes of an array of photodiodes are connected to a common ground electrode and the cathodes of the array are connected via current limiting resistors to a common bias electrode for applying a bias voltage across the diodes.

The silicon photomultiplier 100 integrates a dense array of small, electrically and optically isolated Geigermode photodiodes 215. Each photodiode 215 is coupled in series to a quench resistor 220. Each photodiode 215 is referred to as a microcell. The number of microcells typically number between 100 and 3000 per mm$^2$. The signals of all microcells are then summed to form the output of the SiPM 200. A simplified electrical circuit is provided to illustrate the concept in FIG. 2. Each microcell detects photons identically and independently. The sum of the discharge currents from each of these individual binary detectors combines to form a quasi-analog output, and is thus capable of giving information on the magnitude of an incident photon flux.

Each microcell generates a highly uniform and quantized amount of charge every time the microcell undergoes a Geiger breakdown. The gain of a microcell (and hence the detector) is defined as the ratio of the output charge to the charge on an electron. The output charge can be calculated from the over-voltage and the microcell capacitance.

$$G = \frac{C \cdot \Delta V}{q}$$

Where:
G is the gain of the microcell;
C is the capacitance of the microcell;
ΔV is the over-voltage; and
q is the charge of an electron.

There are an increasing number of ranging and sensing applications looking to benefit from low-power, high-performance SiPM technology. LiDAR is a ranging technique that is increasingly being employed in applications such as mobile range finding, automotive ADAS (Advanced Driver Assistance Systems), gesture recognition and 3D mapping. Employing an SiPM as the photosensor has a number of advantages over alternative sensor technologies such as APD, PIN diode and PMT particularly for mobile and high volume products.

Figure 3:
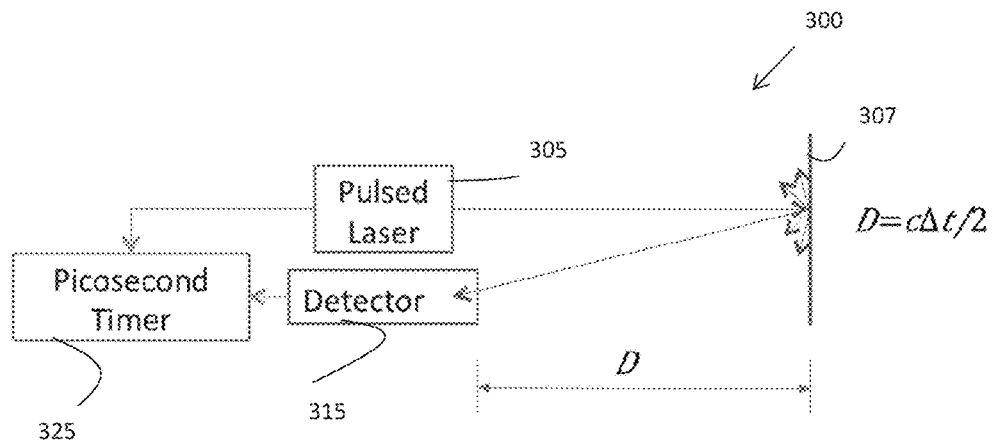
FIG. 3 illustrates an exemplary technique for a direct ToF ranging.

The basic components of an exemplary direct ToF ranging system 300 is illustrated in FIG. 3. In the direct ToF technique, a periodic laser pulse 305 is directed at the target 307, typically with eye-safe power and wavelength in the infrared region. The target 307 diffuses and reflects the laser photons and some of the photons are reflected back towards a detector 315. The detector 315 converts the detected laser photons (and some detected photons due to noise) to electrical signals that are then timestamped by the timer 325.

This time of flight, t, can be used to calculate the distance, D, to the target from the equation D=cΔt/2, where c=speed of light and Δt=time of flight. The sensor 315 must discriminate returned laser photons from the noise (ambient light). At least one timestamp is captured per laser pulse. This is known as a single-shot measurement. The signal to noise ratio can be dramatically improved when the data from many single shot measurements are combined to produce a ranging measurement from which the timing of the detected laser pulses can be extracted with high precision and accuracy.

Figure 4:
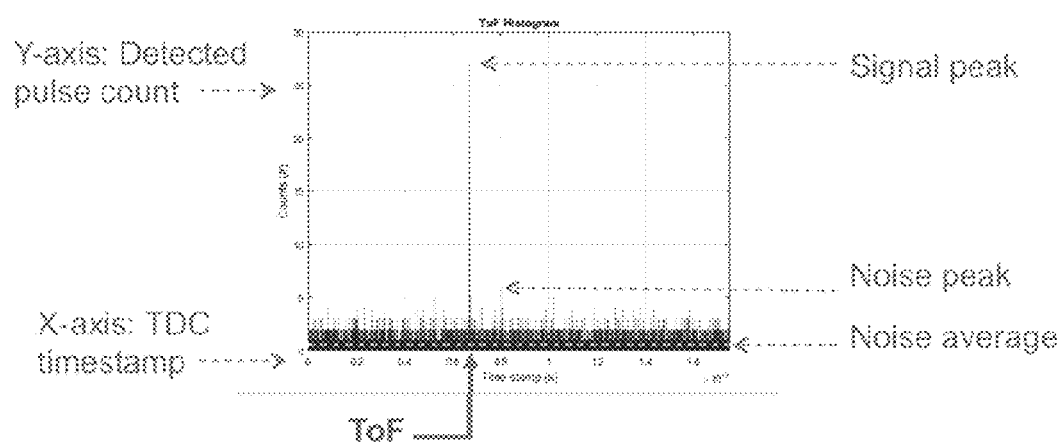
FIG. 4 illustrates an exemplary histogram generated using the ToF ranging.

Each time the laser 305 is pulsed an acquisition system performs a single-shot measurement. Depending on many factors including the laser power and distance to the target, the number of detected laser photons per pulse may be low. Ideally, each detected photon would be timestamped. Usually, many single-shot timing measurements, each containing one or more timestamps, are combined to produce a frame. The complete timing data obtained over the course of a single frame may be plotted in the form of a histogram as shown in FIG. 4. The system ranging performance is limited by the quality of the histogram data, which in turn is affected by the system parameters.

The present disclosure describes to a technique of real time histogramming for determining the time of flight of a photon from its source to a target and back to a photo sensor. A Time to Digital Converter (TDC) is used to measure the time of flight of a photon from a laser pulse to a target and back to a photo sensor. The digital time is used as an address to access a corresponding memory location. Each memory location corresponds to a time period equal to the least significant bit of the TDC. This memory location is then incremented. Multiple measurements will result in the electronics building up a histogram in memory, where each memory location, called a time-bin, will report the number of times the TDC recorded that specific time. After a set number of samples the memory locations will contain a peak region where the majority of TDC times were recorded. By analysing this peak, using a suitable algorithm, the time of flight of the photon can be determined to an accuracy of less than the width of a single time-bin.

Figure 5:
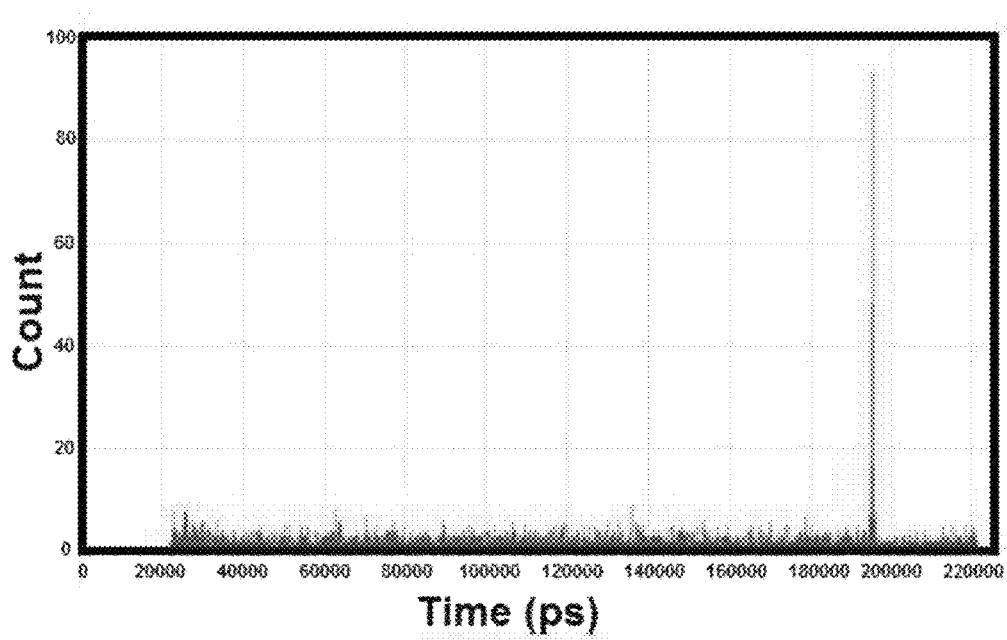
FIG. 5 illustrates an exemplary histogram generated using the ToF ranging.

Initially, the development of the histogramming technique involved periodically streaming the contents of all the time bins to a host computer. The host computer would then analyse the data to determine the position of the peak. FIG. 5 shows a typical plot of ranging data. It can be seen that it comprises of a steady noise level due to false events with a large peak corresponding to when the return laser photons are detected. To determine the range, the host computer selected the region of interest (peak region) and carried out a Gaussian fit to determine the true peak. This technique proved successful but found to be extremely time consuming requiring the streaming of large amounts of data (32K×16 bit words) and then implementing a complex calculation. In a practical application the time taken using this technique would not be acceptable.

Figure 6:
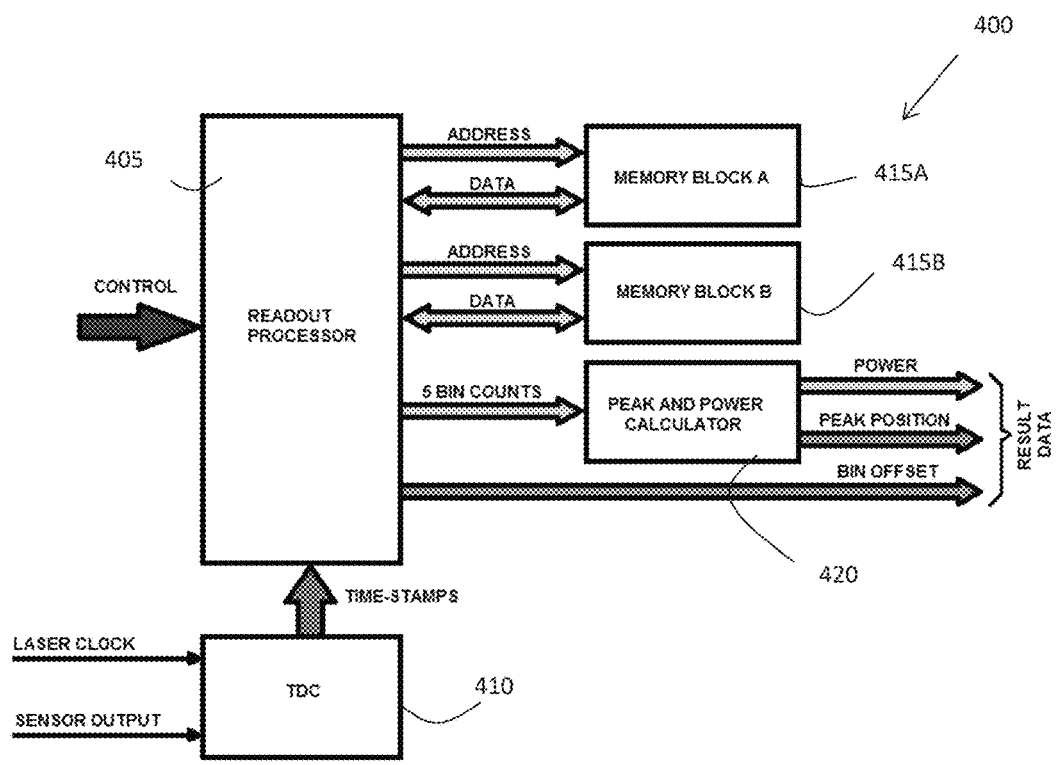
FIG. 6 illustrates a readout circuit for determining ToF in accordance with the present teaching.

Referring to FIG. 6 which illustrates an exemplary readout circuit 400 in accordance with the present teaching which addresses these problems by implementing a state machine to carry out calculation thereby removing the necessity to transfer large packets of data. The readout circuit 400 comprises a readout processor 405, a TDC 410, a pair of memory blocks 415A, 415B, and a peak and power calculator 420. The TDC 410 is a very high precision counter/timer that can record the time of an event to sub 1 ns resolution. The TDC is used to measure the time of flight of a photon from a laser pulse to a target and back to a photo sensor. The digital time, provided by the TDC, is used as an address to access a corresponding memory location. Each memory location corresponds to a time period equal to the least significant bit of the TDC. This memory location is then incremented. Multiple measurements will result in the readout circuit building up a histogram in memory, where each memory location, called a time-bin, will report the number of times the TDC recorded that specific time. After a set number of samples the memory locations will contain a peak region where the majority of TDC times were recorded. By analysing this peak, using a suitable algorithm, the time of flight of the photon can be determined to an accuracy of less than the width of a single time-bin.

The operation of the readout circuit 400 is described with reference to the flowchart 500 of FIG. 7. Initially, the contents in memory blocks 415A and 415B are cleared such that the content is set to zero, step 1. The readout processor 405 is configured to implement a state machine which uses the two identical memory blocks 415A and 415B. In operation one memory block is cleared whilst the other memory is being used for the histogramming. The state machine starts with histogramming in memory block 415A, step 2. The readout processor 405 keeps two variables, Peak Pointer (PP) and Peak Value (PV). At initialisation these variables are set to 0, step 3. The state machine waits for an event to be detected by the TDC. During this time, while there are no events the state machine clears the memory locations of the 'other' memory block 415B. As the clock of the state machine is much greater than the event rate, the state machine is able to clear all the buffer locations during the time waiting for an event, step 4. If the event is not due to the laser pulse the state machine loops back to poll for another event, step 5. If it is a laser pulse then the time of the event in the TDC is saved, step 6. The state machine waits for an event to be detected by the TDC. During this time, while there are no events the state machine clears the memory locations of the other memory block (415A or 415B), step 7. If the event was due to a returned photon then the time of this event is saved and the state machine jumps to step 9. Otherwise the state machine jumps to step 12. The time of the laser is then subtracted from the photon time to create an address for the time-bin, step 9.

The state machine now uses this address to read the contents of the time-bin, increments it and writes it back out, step 10. This new time-bin value is compared with the current value of the Peak Value (PA). If this value is greater, it is copied into the PA and the time-bin address is copied into the Peak Value (PV). The state machine then jumps back to get another photon event (step 7). The process switches back to step 7 to post multiple photon events for each laser cycle, step 11. The state machine goes to this state when a new laser pulse is detected in steps 8, 12, 13. The state machine now checks if the pre-defined number of laser cycles required to acquire a measurement has been reached. If is not complete then the state machine loops back to save the TDC value for the laser event at step 6 for a new cycle, step 12. If the cycle count is complete then the state machine reads back five memory locations, two before the PP address, the location at the PP address and two after the PP address, step 13. These five values are then presented to the peak and power calculator 420 for determining the power and peak position data, step 14. These calculated values are then reported by the state machine to the system, step 15.

Finally the state machine now flips pointers to the other memory block (that was cleared during the previous histogramming) and goes back to step 3 to repeat the process, step 16.

It can be seen from the flow chart 500 that for each laser clock, multiple sensor events are processed. Initially the design only processed the first sensor event and then waited for the next laser clock event. However, this was found to give poor results when operating with high ambient light levels. As there was a high number of unwanted photons (noise) it was likely that one of these photons would be detected first. By processing multiple sensor events the likelihood of processing the signal events improved considerably.

Figure 8A:
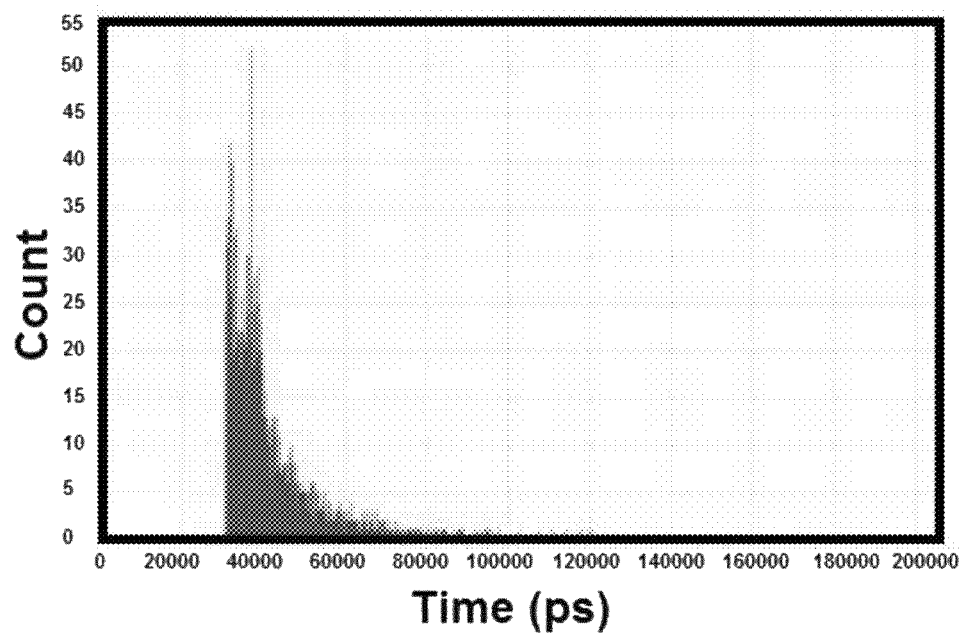
FIG. 8A illustrates an exemplary histogram generated using the readout circuit of FIG. 6.
Figure 8B:
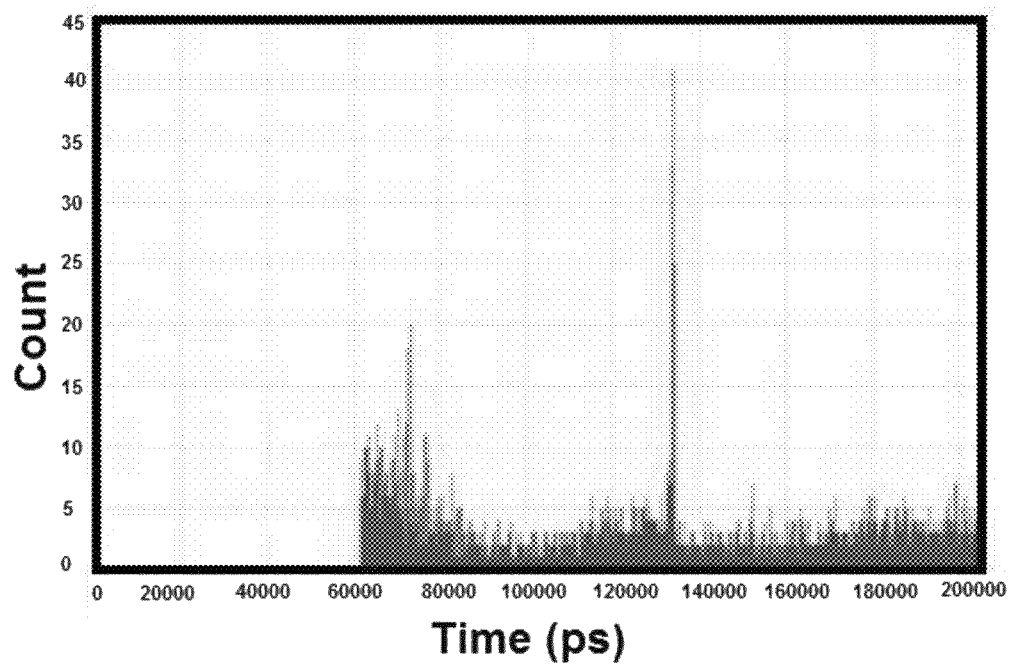
FIG. 8B illustrates an exemplary histogram generated using the readout circuit of FIG. 6.

FIG. 8A show a histogram for a single sensor event and FIG. 8B illustrates a histogram for multiple sensor event processing in high ambient light. It can be seen from FIG. 8A that for a single sensor event processing, the light noise is detected immediately resulting in loss of the actual signal. However, by processing multiple sensor events as illustrated in FIG. 8B in accordance with the present teaching the real signal photons are detected resulting in a relatively smooth noise floor with a dominant peak corresponding to the arrival time of the signal.

Figure 7:
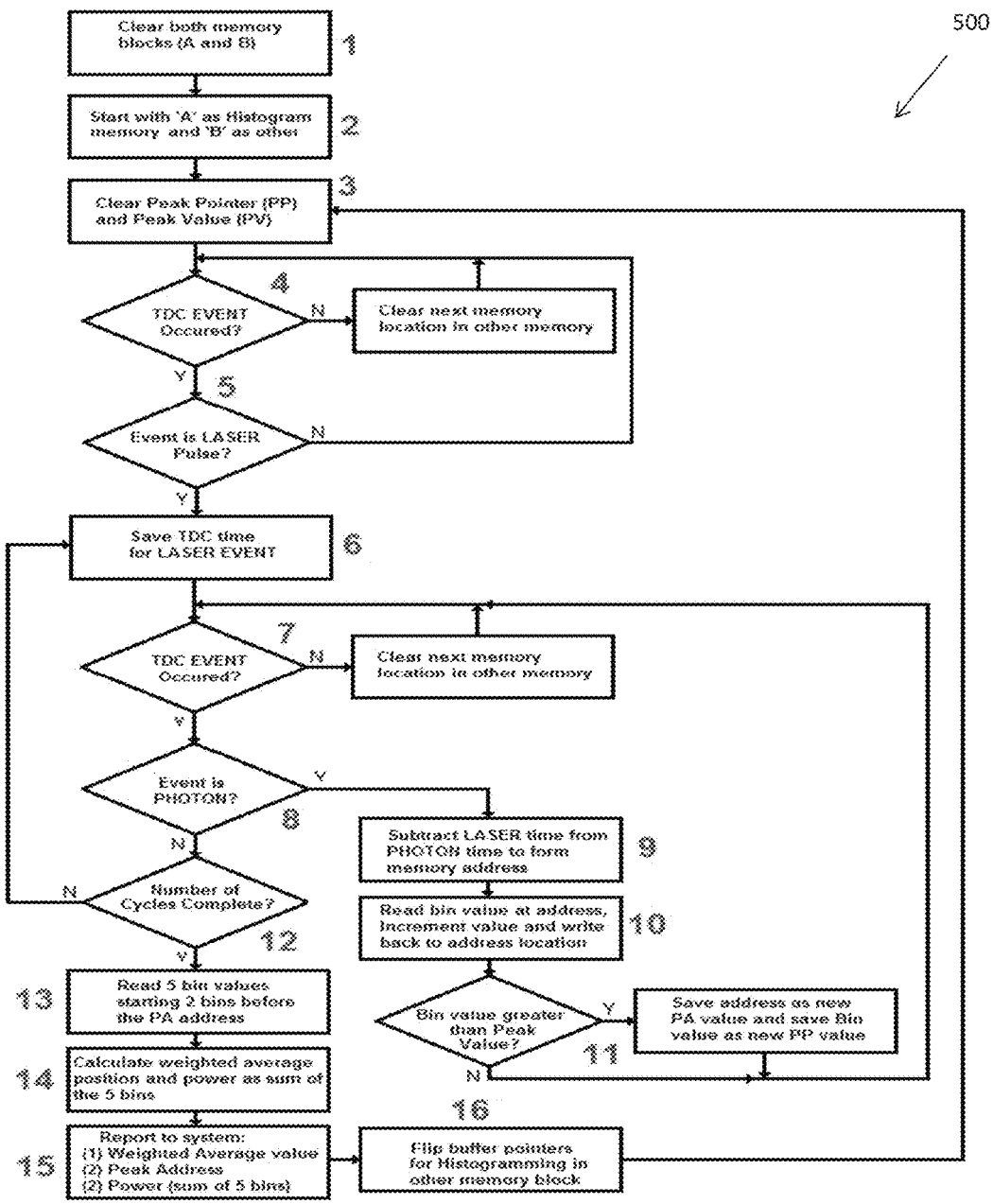
FIG. 7 illustrates a flow chart representing a state machine implemented by the readout circuit of FIG. 6.

FIG. 9 illustrates an exemplary top level design of a histogram readout circuit 900 which may be configured to implement the state machine of FIG. 7 using a field programmable gate array (FPGA). The FPGA may be programmed to implement the readout processor 405 and the TDC 410. The TDC continually reports time-stamps defining the arrival time of the laser clock and the signal output from the sensor. When an event is detected from the laser clock the time-stamp is saved by the FPGA. The FPGA readout processor then reads all TDC events from the sensor circuit output and by subtraction (Sensor time—Laser Clock time) determines the time of flight of each of the photons detected by the sensor. This is repeated until another event is detected from the LASER clock.

Each calculated time of flight (Sensor time—Laser Clock time) is used to address memory in the FPGA. The contents of this location is read, incremented and then written back to that location. Hence, the state FPGA processor builds up a histogram of the TDC data values using the memory locations as time-bins. At the same time, the state machine keeps a pointer to the location where the highest count resides.

After a set cycle time the state machine stops recording the histogram and reads the value of the maximum location (peak) and the two adjacent time-bins either side. These five values, plus the absolute memory address of the first value are then passed to the peak and power calculator for processing.

It can be seen in FIG. 6 that there are two memory address blocks 415A and 415B. This is done to implement flip-flop buffers for the histogramming. The histogramming technique requires to start with all bins set to zero. By implementing flip-flop memory buffers the readout processor can carry out the histogramming process whilst simultaneously clearing the other buffer ready for the next cycle.

The top level design may be implemented using an ALTERA Cyclone III FPGA by way of example. However, it is not intended to limit the present teaching to a particular type of FPGA. The design comprises three modules, namely, READOUT, Lpb_ram_dq0, and HIST_CALC. The readout module contains the main readout state machine that carries out the histogramming process. The Lpb_ram_dq0 module provides the memory block for saving the histogram data. Two FLIP-FLOP bocks are implemented by simply toggling the state of the MSB of the address (address bit 10). The HIST_CALC module receives the value of the five bins and produces the energy and distance (weighted average) results. The purpose of the I/O signals are described in table 1.

TABLE 1

I/O Signal Descriptions

| SIGNAL NAME | TYPE | DESCRIPTION |
|---|---|---|
| RESET | INPUT | Reset signal for the READOUT state machine |
| RUN | INPUT | Active HIGH commands the state machine to start processing |
| SMCLK | INPUT | State Machine Clock (200 MHz) |
| TDCLK | INPUT | LO-HI on this input indicates an event (PHOTON or LASER) |
| TDDATA | 13-bit INPUT | Current TDC time value due to last event |
| BINOFF | 13-bit OUTPUT | This value defines the address offset of the 5 BINS |
| ENERGY | 16-bit OUTPUT | This value is the SUM of the 5 bins used for calculating distance |
| DISTANCE | 16-bit OUTPUT | This is the calculated weighted average value (x16) |
| RUNNING | OUTPUT | Active high indicating that the state machine is busy |

Figure 10:
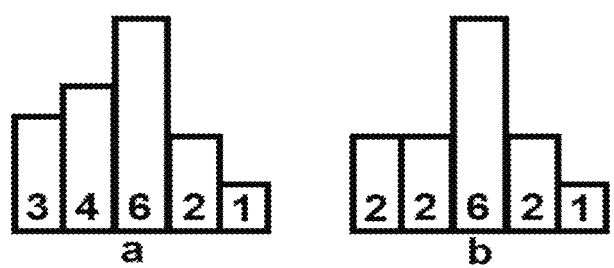
FIG. 10 illustrates exemplary values which are processed using the readout circuit of FIG. 9.

The peak and power calculator 420 receives the five peak bin values and from this determines an accurate value for the timing. FIG. 10 illustrates a simple example of two sets of data. The FPGA uses weighted averaging to calculate the high resolution timing. The formula for calculating the weighted average is as follows:

$$\bar{x} = \frac{\sum_{i=1}^{n} w_i x_i}{\sum_{i=1}^{n} w_i}$$

As the FPGA cannot implement floating point calculation the numerator is scaled up by sixteen. This maintains the resolution after the division is carries out. Therefore, for 'a' and 'b' the FPGA calculation is as follows:

$$a=(((1\times 3)+(2\times 4)+(3\times 6)+(4\times 2)+(5\times 1))\times 16)/(3+4+6+2+1)=37$$

$$b=(((1\times 2)+(2\times 2)+(3\times 6)+(4\times 2)+(5\times 1))\times 16)/(2+2+6+2+1)=45$$

These values are reported as a 16-bit output (PEAK POSITION). As well as this, the module also reports the SUM of the 5 bins to indicate the strength of the signal peak (POWER).

The READOUT module reports, as an output, the position of 1st bin as BIN OFFSET. Hence, from this data, a host processor interfacing to the FPGA can very quickly determine the high resolution timing of the photon. If it is assumed that in the previous example that BIN OFFSET in both cases was 232 and that the LSB of the TDC was 250 ps then the high resolution timing for 'a' and 'b' is:

$$a=(232+(37/16))\times 250=58578 \text{ ps}$$

$$b=(232+(45/16))\times 250=58703 \text{ ps}$$

It can be seen that, although the peak value for both was 6, the influence of the neighbouring bins has resulting in far different values. From this, it is shown that the ToF value can be measured to an accuracy of less than the LSB of the TDC.

Figure 11:
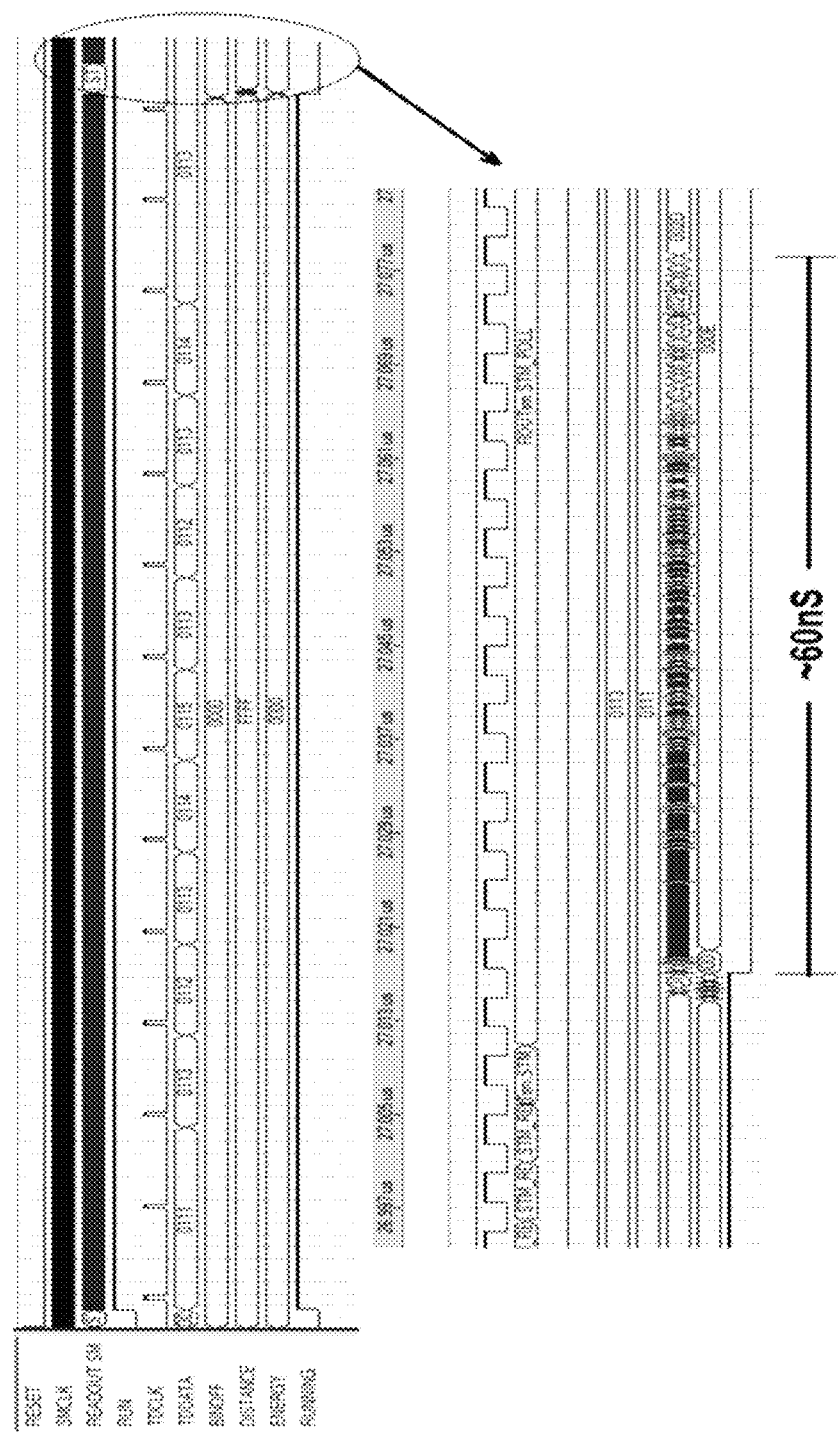
FIG. 11 illustrates simulated graphs using data from the readout circuit of FIG. 9.

An exemplary simulation of the design 900 is illustrated in FIG. 11. As well as the standard I/O signals the state of the state machine (READOUT SM) is also included. For ease of description in the exemplary embodiment it is assumed that:
1. The TDC searches for LASER and PHOTON events, generates a pulse on input TDCLK and reports the delta time (PHOTON TIME minus LASER time) on the TDDATA 13-bit input.
2. The state machine will complete data acquisition after 14 events received.

The start of accumulation of histogram data is indicated by the LO-HI transition of the input RUN signal. Once this occurs the state machine polls the TDCLK input for events. While polling for TDCLK events the state machine is continually clearing the memory in the 'other' histogram buffer.

When a TDCLK event is detected, the state machine reads the value of TDDATA and uses this value as an address for the memory buffer. The contents of this memory location is read, incremented and the new value written back out. The state machine also keeps a pointer defining the location of the largest bin value. This process is described in the flow chart 500.

On completion of the total events (in this case 14) the state machine passes the value of the peak BIN and two either side to the HIST_CALC module to determine the weighted average and total power of the five bins. The bottom frame of FIG. 11 is a zoomed in region at the end of the acquisition. It can be seen that there is a delay of ~60 ns before the resulting weighted average value (0x2D) is calculated. So, with the BINOFF output defining the start of five bins and the weighted calculation, the accurate ranging distance can be determined.

Figure 12:
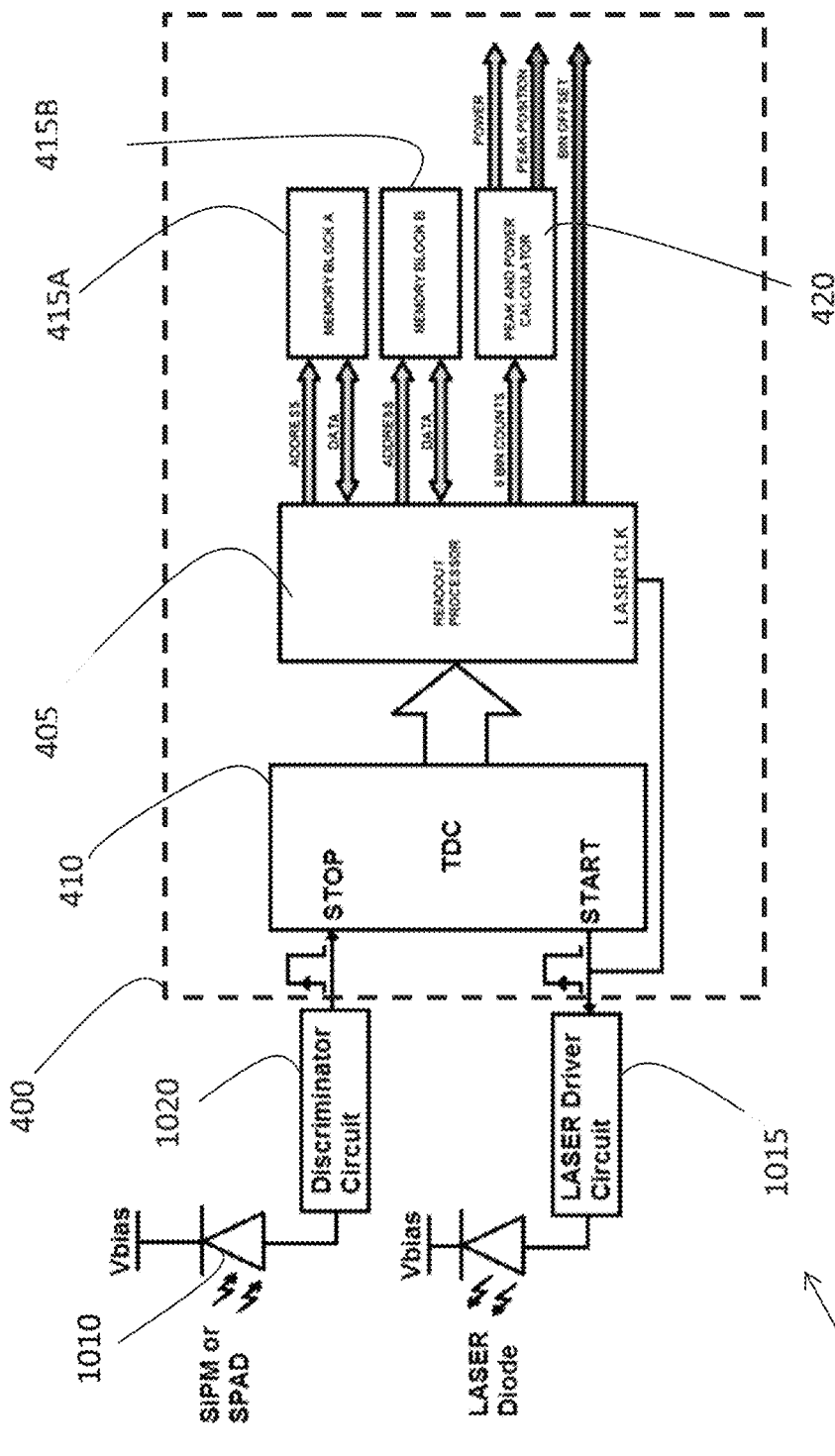
FIG. 12 illustrates a LiDAR ranging system which is also in accordance with the present teaching.

Referring to FIG. 12 there is illustrated a LiDAR ranging system 1000 which includes a SPAD or SiPM device 1010 operably coupled to the readout circuit 400 as described with reference to FIG. 6. A driver circuit 1015 is driven by a clock to launch laser pulses. The same clock is also used to trigger the start of the TDC 405. Returned photons are detected by the SPAD/SiPM device 1010. Then, a discriminator circuit 1020 converts these events into digital pulses. The TDC 405 times the difference between the emitted photon and returned photons. These delta time values are fed to the readout circuit 400 for plotting histograms and calculating the distance travelled by the photons.

Figure 13:
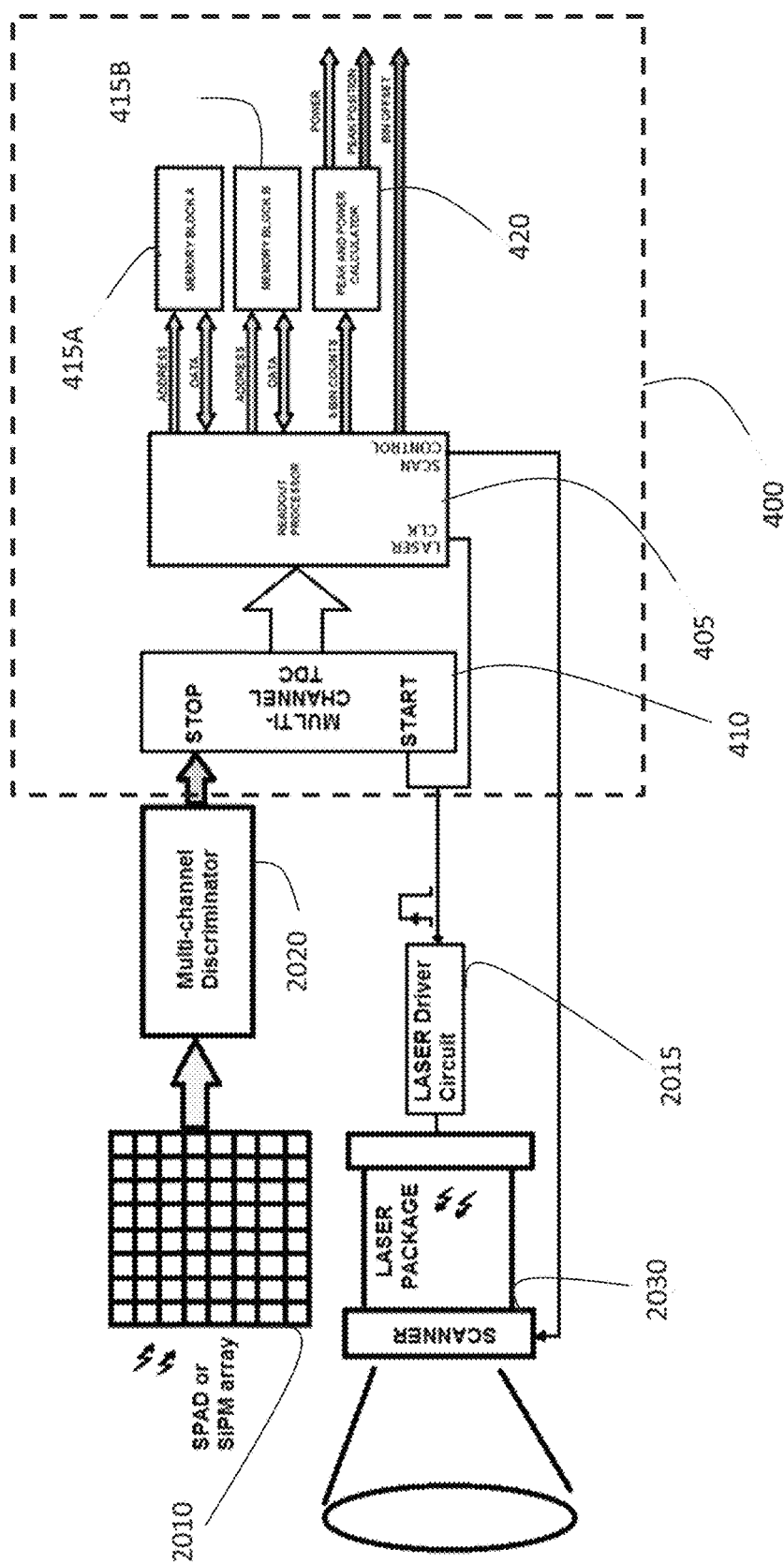
FIG. 13 illustrates a LiDAR 2D imaging system which is also in accordance with the present teaching.

Referring to FIG. 13 there is illustrated a LiDAR 2D imaging system 2000 which includes an array 2010 of SPAD or SiPM devices which are operably coupled to the readout circuit 400 as described with reference to FIG. 6. A multi-LASER diode driver circuit 2015 is driven by a clock to launch laser pulses. The same clock is also used to trigger the start of a multi-channel TDC 410. Returned photons are detected by the array 2010 of SPAD/SiPM devices. A multi-channel discriminator circuit 2020 converts these events into digital pulses. The TDC 410 times the difference between emitted photon and returned photons. These delta time values are fed to the readout circuit 400 for plotting multiple histograms and calculating the distance travelled by the photons.

The readout state machine also controls a scanner 2035 for diverting the laser light pulses over a 2D region. The multi-channel discriminator 2020 passes the events to different inputs of the TDC 410 based on the particular SiPM or SPAD within the array 2010. The TDC 410, in turn, stamps a delta time value with a channel ID to enable the readout circuit 400 to identify the particular pixel within the array 2010. Therefore the readout processor 405 is required to maintain 'N' histogram memory blocks where 'N' is the number of sensors in the array 2010.

It will be appreciated by the person of skill in the art that various modifications may be made to the above described embodiments without departing from the scope of the present invention. In this way it will be understood that the teaching is to be limited only insofar as is deemed necessary in the light of the appended claims. The term semiconductor photomultiplier is intended to cover any solid state photomultiplier device such as Silicon Photomultiplier [SiPM], MicroPixel Photon Counters [MPPC], MicroPixel Avalanche Photodiodes [MAPD] but not limited to.

Similarly the words comprises/comprising when used in the specification are used to specify the presence of stated features, integers, steps or components but do not preclude the presence or addition of one or more additional features, integers, steps, components or groups thereof.

We claim:

1. A histogramming readout circuit comprising:
    a time to digital converter (TDC) being configured to report time-stamps when a TDC event is detected;
    memory for storing TDC events;
    a programmable processor configured to implement a state machine, the state machine being operable to:
        save a time-stamp when a TDC event is detected;
        determine a time of flight of a photon;
        using each calculated time of flight, address a memory location;
        build up a histogram of TDC events using a plurality of memory locations as corresponding time-bins; and
        maintain a pointer to a maximum memory location where a highest number of TDC event resides; and
    a calculator being operable to read a value of the maximum memory location and one or more adjacent time-bins for processing.

2. A histogramming readout circuit as claimed in claim 1, wherein the memory comprises a first memory module and a second memory module.

3. A histogramming readout circuit as claimed in claim 2, wherein one of the first memory module and second memory module is used for histogramming while contents of the other one of the first and second memory modules is being cleared.

4. A histogramming readout circuit as claimed in claim 3, wherein the state machine maintains at least one flag indicating which one of the first memory module and the second memory module is active during histogramming while the other one of first memory module and the second memory module is inactive.

5. A histogramming readout circuit as claimed in claim 1, wherein the state machine tracks at least two variables.

6. A histogramming readout circuit as claimed in claim 5, wherein the at least two variables include a peak pointer and a peak value.

7. A histogramming readout circuit as claimed in claim 6, wherein the state machine reads the contents of a first time-bin, increments the contents of the first time-bin, and increments the address to generate a new time-bin address.

8. A histogramming readout circuit as claimed in claim 7, wherein the contents of the new time-bin address is compared with the contents of the first time-bin corresponding to the contents of the time-bin addressed by the peak pointer.

9. A histogramming readout circuit as claimed in claim 8, wherein if the of the first time-bin is greater than the peak value, the value of the first time-bin is saved as the peak value and the address of the first time-bin address is saved as the peak pointer.

10. A histogramming readout circuit as claimed in claim 9, wherein the state machine subsequently waits for another TDC event.

11. A histogramming readout circuit as claimed in claim 1, wherein the state machine checks if a pre-defined number of laser cycles required to acquire a measurement has been reached.

12. A histogramming readout circuit as claimed in claim 11, wherein if the pre-defined number of laser cycles has been reached, the state machine reads a plurality of data values from a corresponding plurality of memory locations starting one or more memory locations before the peak pointer address, a memory location at the peak pointer address and one or more memory locations after the peak pointer address.

13. A histogramming readout circuit as claimed in claim 12, wherein the state machine reads five memory locations, the five memory locations including two memory locations before the peak pointer address, the memory location at the peak pointer address, and two memory locations after the peak pointer address.

14. A histogramming readout circuit as claimed in claim 12, wherein the plurality of data values is acquired by the calculator for determining power and peak position data.

15. A histogramming readout circuit as claimed in claim 3, wherein the state machine reverses the pointers to the other memory module that was previously being cleared so that it is active for storing TDC events for the next pre-defined number of laser cycles.

16. A histogram readout method for determining the time of flight of a photon using the circuit of claim 1, the method comprising:
    (i) measuring the time of flight of a photon from a laser pulse to a target and back to a photosensor using a Time to Digital Converter (TDC);
    (ii) using the digital time as an address to access a corresponding memory location; each memory location corresponds to a time period equal to the least significant bit of the TDC;
    (iii) incrementing the memory location;
    generating a histogram by repeating steps (i) to (iii) a plurality times; wherein each memory location reports the number of times the TDC recorded that specific time;
    after a predetermined number of samples the memory locations will contain a peak region where the majority of TDC times were recorded; and
    analysing the peak region to determine the time of flight of the photon.

17. A readout method of claim 16, wherein after a set cycle time a state machine stops recording the histogram and reads the value of the maximum location and one or more adjacent time-bins either side thereof.

18. A readout method of claim 17, wherein these read values are then passed to a calculation module for calculating the ToF value.

19. A readout method of claim 18, wherein the calculation module uses weighted averaging to calculate the ToF.

20. A readout method of claim 19, wherein the numerator is scaled up by 16.

21. A readout method of claim 18, wherein the calculation module outputs the ToF value in real time.

22. A readout method of claim 18, wherein the calculation module is programed to sum the read values as an indication of the level of activity.

23. A readout method of claim 18, wherein the calculation module is operable to calculate the ToF value to an accuracy of less than the LSB of the TDC.

24. A LiDAR ranging system comprising:
   a histogramming readout circuit as claimed in claim 1; and
   a light detector operably coupled to the histogramming readout circuit.

25. A LiDAR ranging system of claim 24, wherein the light detector comprises a single photon avalanche diode (SPAD).

26. A LiDAR ranging system of claim 24, wherein the light detector comprises a silicon photomultiplier.

27. A LiDAR 2D imaging system comprising:
   a histogramming readout circuit as claimed in claim 1;
   a light detector operably coupled to the histogramming readout circuit; and
   a scanner for diverting laser light pulses over a 2D region.

28. A LiDAR ranging system of claim 27, wherein the light detector comprises an array of single photon avalanche diodes (SPAD).

29. A LiDAR ranging system of claim 27, wherein the light detector comprises an array of silicon photomultipliers.

* * * * *